United States Patent
Lauer et al.

[11] Patent Number: 6,054,078
[45] Date of Patent: Apr. 25, 2000

[54] INTEGRALLY BONDED, MULTILAYER FOAMED PRODUCT

[75] Inventors: Eduardo Lauer, Zebulon; Michael P. Laughner, Clayton; Michael W. Allman, Wilson, all of N.C.

[73] Assignee: Nomaco, Inc., Zebulon, N.C.

[21] Appl. No.: 09/170,605

[22] Filed: Oct. 13, 1998

Related U.S. Application Data

[62] Division of application No. 08/874,332, Jun. 13, 1997, Pat. No. 5,904,970.

[51] Int. Cl.[7] .................................................. B29C 44/24
[52] U.S. Cl. .................... 264/45.9; 264/48; 264/271.1; 264/321
[58] Field of Search .................. 264/321, 45.9, 264/271.1, 48, 129, 45.1

[56] References Cited

U.S. PATENT DOCUMENTS

| | | | |
|---|---|---|---|
| 3,281,259 | 10/1966 | Lux et al. | 264/48 |
| 3,922,328 | 11/1975 | Johnson | 264/48 |
| 4,146,562 | 3/1979 | Fukushima et al. | 264/45.5 |
| 4,206,165 | 6/1980 | Dukess | 264/45.9 |
| 4,221,624 | 9/1980 | Eslinger et al. | 264/45.9 |
| 4,265,972 | 5/1981 | Rudner | 264/45.9 |
| 4,322,260 | 3/1982 | Conlon | 264/45.9 |
| 4,364,882 | 12/1982 | Doucet | 264/45.9 |
| 4,399,086 | 8/1983 | Walter | 264/48 |
| 4,426,065 | 1/1984 | Komatsuzaki et al. | 264/321 |
| 4,518,557 | 5/1985 | Wecker | 264/45.9 |

*Primary Examiner*—Allan R. Kuhns
*Attorney, Agent, or Firm*—Melvin I. Stoltz

[57] ABSTRACT

By employing a unique manufacturing process, unique manufacturing equipment, or a unique combination of materials, a fully integrated, multilayer foamed thermoplastic or elastomeric member or profile having a core member peripherally surrounded by an outer protective layer is attained which is virtually incapable of being removed from said core member. By effectively melting the adjacent surfaces of the foamed layers being interengaged, a core member having any desired cross-sectional shape is produced and is peripherally surrounded with an outer layer integrally bonded thereto. In one aspect of the present invention, metallocene catalyzed plastic material is employed in forming the core member to impart desirable physical attributes thereto. In an alternate aspect of the present invention, a manufacturing method or processing equipment are employed for assuring the integral bonded engagement of the outer protective layer to the core member, on a mass produced basis, which assures secure, affixed, bonded interengagement of the protective layer to the core member.

14 Claims, 2 Drawing Sheets

INTEGRALLY BONDED, MULTILAYER FOAMED PRODUCT

This application is a divisional patent application of Ser. No. 08/874,332, filed Jun. 13, 1997, now U.S. Pat. No. 5,904,970 for an Integrally Bonded, Multilayer Foamed Product.

TECHNICAL FIELD

This invention relates to foamed multilayer thermoplastic or elastomeric members or profiles and, more particularly, to multilayer profiles wherein an outer layer peripherally surrounds a core member in intimate, bonded interengagement therewith, as well as methods and equipment used for manufacturing said members or profiles.

BACKGROUND ART

For over four decades, extruded thermoplastic or elastomeric foam articles have been manufactured and distributed for a wide variety of uses. Over the years, numerous additional end products have benefitted from foamed thermoplastic or elastomeric members. Typical applications and fields in which such products have received substantial use and distribution include toys, furniture, beddings, packaging, shock absorption, construction, agriculture, insulation, and recreation.

In developing additional markets for foamed thermoplastic and elastomeric members, the practice of reducing the density of the polymer resin to produce a foamed article having a low density has received increasing attention. Presently, thermoplastic or elastomeric foams are categorized as either high or low density foam and are divided at approximately 240 kg/m$^3$ (15 lbs/ft$^3$).

Many favorable advantages are attained by reducing the density of the foamed products. Typically, these favorable properties include an increase in insulation value, an increase in flexibility of the product, cost reduction, higher resiliency, and increased rates of production. Unfortunately, some desirable properties are sacrificed with density reduction, such as a reduction in mechanical properties of the resulting product. Typically, mechanical properties are reduced at an approximate rate proportional to one over the density reduction squared. In order to overcome the reduction in mechanical properties, many applications employ a combination of different materials having different densities, attempting to produce a resulting product which will possess the desired physical characteristics.

Typically, thermoplastic or elastomeric members of this nature which incorporate a plurality of different materials of different densities are produced by coextrusion or cross-head extrusion. By employing either of these processes, two or more distinct layers are combined in a single, or multi-step extrusion operation to produce a final product having separate and distinct layers of varying material compositions and/or material densities. These distinct layers may or may not possess integrally bonded interfaces.

The principal distinction between co-extrusion and cross-head extrusion is the number of operations required to produce the final product. In a coextrusion process, a single operation is employed wherein different polymer melts or resins having vastly different properties are combined in a single production operation. In a cross-head extrusion process, one layer of the material is formed and thereafter, the additional layer or layers are applied in a subsequent extrusion operation.

Regardless of which process is employed, the resulting product comprises a plurality of layers integrally bonded to each other with each layer being formed from materials having either a different composition and/or a different density. In addition, other properties such as aesthetics, gas or vapor permeability, organoleptic barriers, printability, sealability, and the like constitute properties often imparted to one or more of the layers in order to provide a final product having particular characteristics.

In most applications, it has been found that cross-head extrusion is highly advantageous when vastly different types of material are to be combined together. Some applications benefitting from a cross-head extrusion process are for products such as plastic coated wires, protective or insulating coatings over metal or rigid materials. In addition, a foam layer peripherally surrounding a solid object or a solid layer peripherally surrounding a foam core are further examples benefitting from being produced by cross-head extrusion. In addition, the application of a more expensive or highly specific coating or layer, such as an antimicrobial layer or a corrosion resistent layer over a less expensive supporting substrate are further examples benefitting from cross-head extrusion processes.

Another area in which integrally bonded, multi-layer thermoplastic or elastomeric members have been extensively employed is for improving product safety in general and reducing injury to individuals due to unwanted or unexpected contact with the underlying product. In this regard, metal frames of products in support structures used by children, the elderly, the injured, or infirm individuals have received substantial attention and have been manufactured and/or improved by employing padding or cushioning protection in order to reduce or eliminate injuries that could result from contact.

Examples of such products are found in amusement parks and playgrounds and include slides, swing sets, moving vehicles, etc. In order to eliminate or reduce injuries, these products are now either manufactured with or retrofitted with padding or thermoplastic or elastomeric foam material to provide a soft, cushioned outer surface to otherwise hard surfaces or structures. In addition to the products detailed above, numerous other products such as race cars, baby furniture, bicycles, hospital beds, support posts for basketball, volleyball, and the like, gym equipment, boat fenders, etc. have all been manufactured with padding or thermoplastic or elastomeric foam constructions for added protection.

In addition, numerous products are manufactured with padded or cushioned outer surfaces for decorative purposes. These products include show booth displays, window displays, and the like. Furthermore, foam encapsulated products have also been commonly employed for insulating purposes, in order to conserve energy and reduce unwanted heat loss through various sources, such as hot water pipes which are exposed to substantially lower ambient temperatures.

In attempting to meet the demands for the products detailed above, foamed thermoplastic and/or elastomeric materials, such as polyethylene, have been accepted as the principal materials for meeting most product requirements. This acceptance has been caused by the ability of foamed thermoplastic and elastomeric to be formed in numerous sizes, shapes, and configurations. As a result, virtually any product can be effectively and efficiently improved by having the surface thereof covered by a soft, insulating, or cushioning member.

Although the products to be enhanced by incorporating an outer cushioned surface comprise a wide variety of sizes and shapes, elongated, cylindrically-shaped tubes typify the principal market for cushioned surfaces. Since elongated cylindrical tubes are used to manufacture posts, slides, railings, water pipes, swing sets, etc., it is readily apparent that such tube members form the principal market area wherein cushioning is desired.

As a result, elongated, longitudinally extending thermoplastic or elastomeric tubes formed from polyethylene foam material have been widely accepted and employed on numerous products for providing the desired soft, compressible, injury reducing surface thereto. Unfortunately, it has been found that these products have been unable to meet all of the demands imposed thereon.

One particular significant drawback that has occurred in these prior art uses, which has been incapable of being satisfactorily resolved, is the inability of these prior art elongated, thermoplastic or elastomeric tubes to withstand repeated abrasion, use, or contact. In general, although these prior art products do provide the desired soft, cushioning surface being sought, these prior art products are continuously receiving repeated contacting use in their installed position, and quickly degrade due to such use.

Prior art foam tubes are typically employed peripherally surrounding and protecting the hard outer surface of playground equipment found in retail outlets, such as food chains, as well as in swing sets employed at home. In order to protect the children playing on this equipment, the supporting frames and exposed metal surfaces are protected with thermoplastic or elastomeric cushioning means. However, during normal play, the children use this equipment continuously, kicking, rubbing, cutting, pulling, and tearing at the thermoplastic foam surfaces, causing such surfaces to be quickly degraded.

Another problem encountered in prior art installations is the inability of the thermoplastic or elastomeric components to withstand exposure from dirt, ink pens, and the like as well as exposure to pencils, crayons, and the like. As a result, in a relatively short time period, newly installed thermoplastic or elastomeric foam members become visually unappealing and unattractive.

In order to overcome these drawbacks, some prior art systems have attempted to peripherally envelope the thermoplastic or elastomeric foam tubes or members with a self-locking or self-sealing protective layer or sheet. Although the installation of such protecting sheets or layers have extended the life of the underlying thermoplastic or elastomeric tubes or members, the protecting sheets or layers are typically separated from the substrate they are protecting by the activities of the users and stripped from their surrounding position. As a result, the surfaces of the underlying thermoplastic or elastomeric members are quickly exposed to physical contact and surface degradation.

Therefore, it is a principal object of the present invention to provide a foamed, multi-layered, thermoplastic or elastomeric member/profile wherein the layers are integrally bonded to each other, providing a multi-layered product having precisely desired physical characteristics.

Another object of the present invention is to provide a foamed, multi-layered thermoplastic or elastomeric member/profile having the characteristic features described above which is capable of being quickly and easily mounted to any desired product to provide the desired physical attributes thereto.

Another object of the present invention is to provide a foamed, multi-layered thermoplastic or elastomeric member/profile having the characteristic features described which is producible in an elongated tubular or cylindrical form and is capable of being easily and quickly installed on any desired curved surfaced to provide a soft, cushioning protection thereto, while also eliminating product degradation or color discoloration during use.

Another object of the present invention is to provide a foamed, multi-layered thermoplastic or elastomeric member/profile having the characteristic features described wherein the outer layer is inherently scratch and puncture resistent, while also being capable of being easily cleaned to provide product longevity and long lasting visual appeal.

A further object of the present invention is to provide a foamed, multi-layered thermoplastic or elastomeric member/profile having the characteristic features described which is capable of being produced in virtually any desired color, configuration, surface treatment, and physical characteristics.

Another object of the present invention is to provide a foamed, multi-layered thermoplastic or elastomeric member/profile having the characteristic features described wherein each of the layers are integrally bonded to the adjacent layer, preventing unwanted removal or peeling of the layers from each other.

Another object of the present invention is to provide a foamed, multi-layered thermoplastic or elastomeric member/profile having the characteristic features described which incorporates layers that are water impermeable while also providing substantially increased resistance to degradation by contact with chemicals.

Another object of the present invention is to provide a foamed, multi-layered thermoplastic or elastomeric member/profile which is capable of being mass produced in any desired quantities, thereby providing a competitively priced product.

Other and more specific objects will in part be obvious and will in part appear hereinafter.

SUMMARY OF THE INVENTION

By employing the present invention, all of the difficulties and drawbacks found in the prior art have been eliminated and a fully integrated, multi-layer foamed thermoplastic or elastomeric member/profile is attained. In accordance with the present invention, this achievement is reached by employing a unique combination of materials for the layers being integrally bonded to each other as well as by employing a unique process for manufacturing the resulting product. In this way, a final product is realized which completely overcomes the problems found in prior art systems and provides a unique, highly desirable and competitively produced long lasting product.

By employing the present invention, any desired configuration of cross-sectional shape of an integrally bonded, multi-layered, foamed thermoplastic or elastomeric member/profile can be produced. For exemplary purposes only, the disclosure provided herein focuses on substantially circular shaped cross-sectional members, due to their broad applicability and use in a wide variety of product areas. However, although foamed thermoplastic or elastomeric members/profiles having a substantially circular cross-sectional shape are detailed herein, the present invention is intended to encompass all products, regardless of the cross-sectional shape or form of the member or profile.

In the present invention, an integrally bonded, multi-layered, foamed thermoplastic or elastomeric member/profile comprises a core member formed from extruded, foamed plastic polymers, copolymers, or homopolymers. Although any known foamable plastic material can be employed in the extrusion process for developing the thermoplastic or elastomeric member/profile of this invention, with the foamable plastic material comprising either open cell or closed cells, the particular plastic material employed is selected to produce the desired physical attributes being sought for the particular characteristics of the end product. However, in general, the density of the foam core preferably ranges between about 10 and 500 kg/m$^3$.

Most foamed thermoplastic or elastomeric materials are categorized as either high density or low density. Typically, 240 kg/m$^3$ represents the dividing line wherein these materials are classified. As detailed below, although high density foam materials can be employed and benefit from the present invention, the detailed disclosure focuses on low density flexible foams since such products have greater commercial interests in numerous applications. In fact, in the preferred embodiment of the present invention, the foamed thermoplastic or elastomeric core member comprises a density ranging between about 10 kg/m$^3$ and 100 kg/m$^3$. However, although most products produced in accordance with the present invention, as detailed herein, comprise this density range, other products having density ranges between about 10 kg/m$^3$ and 500 kg/m$^3$ can benefit from the teaching of the present invention and are all intended to be within the scope of the present invention.

One of the principal aspects of the present invention is the preferable incorporation of metallocene catalyzed polyethylenes in the formulation of the foam material employed for the core member. In this regard, the metallocene catalyzed polyethylene material can range between about 5% to 95% by weight of the entire weight of the core member or profile. By employing metallocene catalyzed polyethylene material in the formulation of the plastic material employed for forming the core member, substantially desirable physical characteristics are realized.

By employing metallocene catalyzed polyethylenes as one ingredient of the plastic materials forming the core member, a substantially improved integral bond is realized between the low density inner core foam layers and the higher density outer layer integrally bonded therewith. In addition, physical properties such as tensile strength and tear strength are also substantially improved, along with the elongation force required to break the material. As a result of these substantially improved physical characteristics, along with other attributes detailed herein, the core member of the present invention incorporates metallocene catalyzed polyethylene material as at least one ingredient thereof.

In addition to the metallocene catalyzed polyethylene material, other plastic materials are employed. Preferably, the other plastic materials are selected from the group consisting of inert polymers, homopolymers, monomers, and copolymers. By employing these materials, in combination with the metallocene catalyzed polyethylene, the desirable physical characteristics for the resulting core member are realized.

In order to further enhance the properties of the foam thermoplastic or elastomeric core member, any desired additives can be incorporated into the polymer material forming the core member. In this regard, additives selected from the group consisting of color, flame retardants, ultraviolet stabilizers, blowing agents, and other additives known to those skilled in this art can be employed to provide the desired end product characteristics. In this way, the final properties sought by a particular end user can be attained.

By employing the present invention, an outer, peripherally surrounding protective layer is integrally bonded to the core member in a manner which virtually eliminates all of the prior art difficulties encountered with removal, separation, or dislocation of the outer protective surface from the base material. In order to provide an outer protective surface, the peripherally surrounding, outer layer preferably comprises a density greater than the density of the core material, with the outer layer being formed from material which provides inherent rigidity and strength, as well as resistance to degradation, puncturing, surface abrasions, etc. In this regard, an outer layer having an overall density ranging between about 100 kg/m$^3$ and 1200 kg/m$^3$ has been found to provide optimum results.

In addition to employing a material formulation constructed for imparting the desired physical characteristics to the outer, peripherally surrounding layer, additives may also be incorporated into the material when applied to the core material. Such additives would typically include density reducing agents, chemical blowing agents, pigments, flame retardants, ultraviolet stabilizers, talc, fibers, fillers, stiffness enhancers, as well as other known additives commonly employed in this art.

By employing the present invention, a foamed thermoplastic or elastomeric core member is peripherally surrounded by an outer surface forming, protective layer which is integrally bonded directly to the outer surface of the thermoplastic or elastomeric core member. In this way, the outer protective layer forms the exposed surface of the resulting thermoplastic or elastomeric member/profile, providing a protective outer surface which is capable of withstanding abrasion, grease, ink, dirt, chemical, physical and environmental contamination, discoloration, and vandalism. As a result, a fully integrated structurally beneficial, multilayer, foamed thermoplastic or elastomeric member/profile is realized which is capable of providing a soft, cushioning protection to any desired surface, while also virtually eliminating unwanted and undesirable damage to the multilayer foamed thermoplastic or elastomeric member.

In addition to providing a unique product formulation for attaining the integrally bonded multilayer foamed thermoplastic or elastomeric member/profile of the present invention, a unique method of manufacturing this product is also attained. In the present invention, an easily executed, inexpensive, efficient process is provided wherein the integrally bonded, multilayer foamed thermoplastic or elastomeric member/profile of the present invention is attained on a mass produced basis, using extrusion foam equipment. By employing the process of the present invention, a low density foamed thermoplastic or elastomeric core member is peripherally surrounded and fully encapsulated with an extruded, high density polymer layer thoroughly bonded to the core member in a manner which provides integral, bonded interengagement between the components in an efficient, controlled manner.

In the process of the present invention, the foamed thermoplastic or elastomeric core or substrate is formed using conventional foam extrusion methods. Once this material has been formed, it may be stored for any desired time period until application of the outer layer is desired. Then, using a uniquely constructed cross head die, the preformed substrate is passed through the cross head die, securely affixing the outer, peripherally surrounding, encapsulated protective layer to the substrate.

In applying the peripherally surrounding protective layer to the core material employing the process of the present invention, the plastic material being employed for the protective layer is prepared in a conventional manner and passed through the cross head die with the temperature thereof being precisely maintained by the cooperatingly associated heating chambers peripherally surrounding and fully enveloping the entire polymer flow zones within the cross head die.

In the preferred construction, the heating chambers are constructed to assure that the heating means passing through the chambers traverses all of the polymer flow equally throughout all passageways thereof. In this way, the precisely desired temperature level for the polymer flow is maintained. In addition, in the preferred construction, the outer surface of the die is surrounded by heating means in order to assure that the precisely desired temperature levels are maintained throughout all areas of the cross head extrusion die.

Another feature incorporated into the cross head die system of the present invention is the delivery angle at which the encapsulated, peripherally surrounding polymer melt is delivered to the substrate for application to the surface of the substrate. In this regard, it has been found that the approach angle is important in assuring that the polymer melt being applied to the substrate surface will exert sufficient pressure on the substrate to achieve the desired homogeneous, integral bonding therewith, while not exerting excessive forces thereon. In general, a delivery angle ranging between about 30° and 90° is preferred.

In the preferred construction, the cross head die of the present invention incorporates a substrate densification zone wherein the substrate material is transferred in a manner which ruptures the closed cells near the substrate surface, effectively increasing the density in this area. Typically, either air or the blowing agent employed in forming the substrate is retained in the closed cells of the substrate. Consequently, by rupturing these cells, the blowing agent is released. If the blowing agent is not released from the surface cells, the cells may be broken later, producing pockets of the blowing agent between the substrate and the outer layer. If this occurs, the intimate bonded interengagement between these two layers is reduced.

In order to aid in the release of the trapped gas(es) from the cells of the outer surface of the substrate, the substrate is heated as the substrate is passed through the cross head die of the present invention. By passing the substrate through a predefined length of the cross head die wherein the substrate is preheated, the gas(es) retained within the cells of the outermost layer of the substrate is released. In addition, vacuum means are provided in the cross head die to remove the blowing agent as the trapped gas(es) are released from the uppermost layer of cells of the substrate material. In this way, any retention of the gas(es) between the two layers is eliminated.

In addition, in the preferred construction, the heated zone is ramped or sloping in order to compress or squeeze the substrate simultaneously with the heating thereof. In this way, substantially increased numbers of cells are broken and gas removal is optimized. As a result, the surface of the substrate is enhanced for providing the desired integral, bonded, engagement of the protective layer to the substrate.

The invention accordingly comprises the several steps and the relation of one or more such steps with respect to the other, the apparatus embodying the features of construction, combination and arrangement of parts which are adapted to effect such steps, and the article produced which possesses the characteristics, properties, and relation of elements all as exemplified in the detailed disclosure hereinafter set forth with the scope of the invention being indicated in the claims.

THE DRAWINGS

For a fuller understanding of the nature and objects of the invention, reference should be had to the following detailed description taken in connection with the accompanying drawings, in which.

DETAILED DESCRIPTION

By employing the present invention, integrally bonded, multilayered, foamed thermoplastic or elastomeric members or profiles are formed incorporating any desired cross-sectional shape or configuration, with each of the profiles possessing an outer layer peripherally surrounding and enveloping the core member and providing the core member with a protective outer surface which resists all types of degradation as well as chemical and physical attacks. Although the present invention can be employed with a foam core having virtually any desired configuration, size, or shape, the present invention is detailed herein in relationship to an elongated, substantially cylindrically shaped, hollow foamed core member, peripherally surrounded and enveloped by an integrally bonded protective layer. However, it is to be understood that the embodiment depicted and detailed in this disclosure is for exemplary purposes only and is not intended to limit the scope of the present invention.

Figure 1:
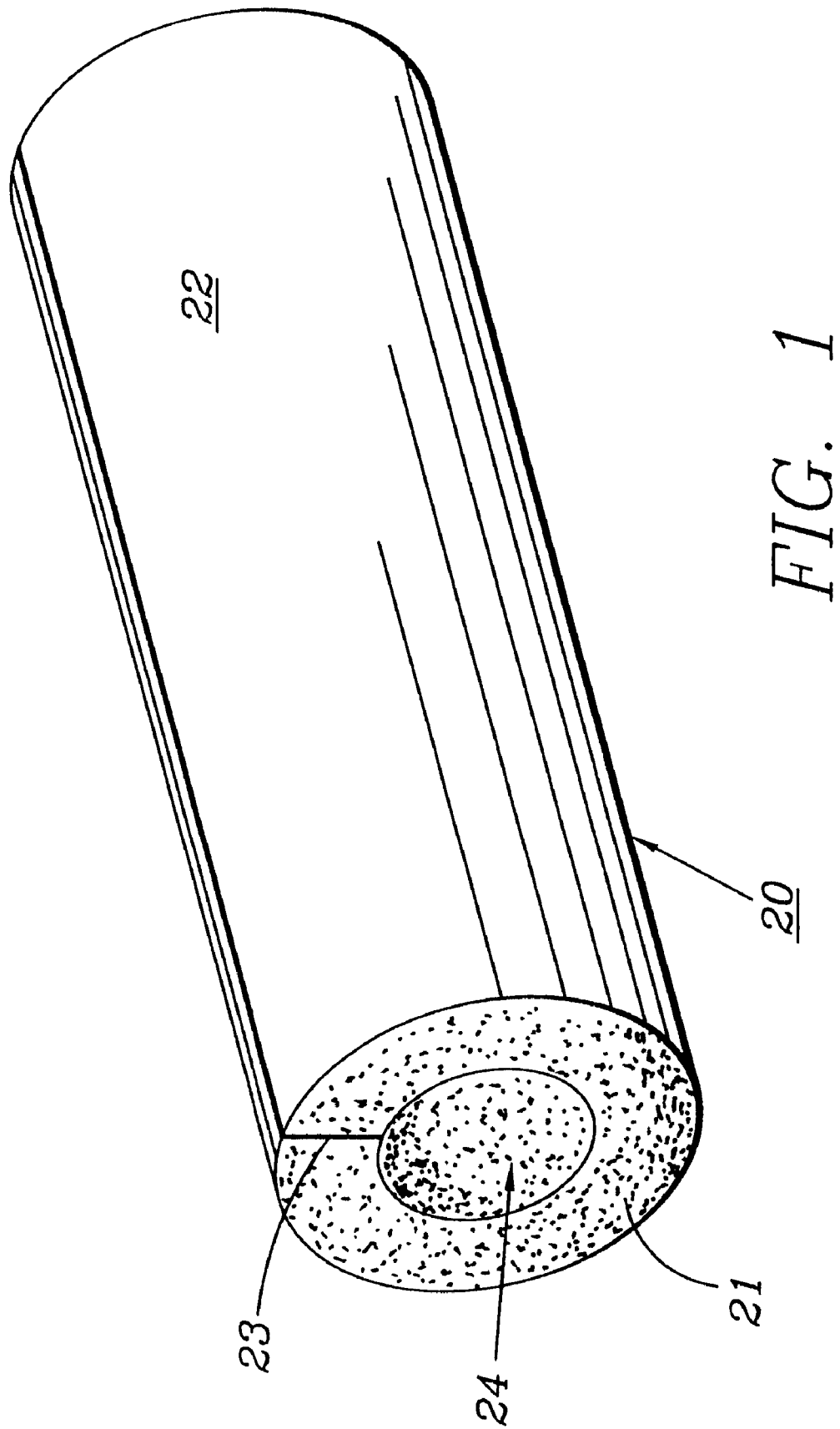
FIG. 1 is a perspective view of one embodiment of an elongated, multilayer, integrally bonded foamed thermoplastic or elastomeric member/profile manufactured in an elongated, hollow, cylindrical shape in accordance with the present invention.

As shown in FIG. 1, elongated, substantially cylindrically shaped, integrally bonded, multilayer member or profile 20 comprises thermoplastic or elastomeric foamed substrate or core member 21 and outer layer 22 peripherally surrounding the surface of core member 21. As detailed herein, outer, peripherally surrounding layer 22 is in secure, bonded, affixed interengagement with core member 21. Furthermore, as depicted in FIG. 1, elongated, cylindrically shaped foamed thermoplastic or elastomeric core member 21 incorporates a central hollow zone 24.

Preferably, integrally bonded, multilayer member/profile 20 also incorporates a longitudinally extending slit 23 which extends from outer layer 22 through the entire thickness of thermoplastic foam core member 21, forming an entryway into the longitudinally extending hollow central zone 24 of thermoplastic or elastomeric core member 21. Although neither central hollow zone 24 nor longitudinally extending slit 23 represent mandatory components of this construction, these features are depicted and discussed herein, since they represent the most common form for an elongated, cylindrically shaped member of this nature.

By achieving integrally bonded, multilayer, foamed member/profile 20 of the present invention with outer layer 22 peripherally surrounding and fully enveloping foamed thermoplastic or elastomeric core member 21, while also being securely affixed in intimate, bonded interengagement therewith, a product is achieved which is capable of overcoming all of the prior art drawbacks and difficulties. By establishing integrally bonded, multilayer foamed member/profile 20, as depicted in FIG. 1, member/profile 20 is easily mounted in any desired location for any desired application, such as swing sets, gym equipment, play yard equipment, etc. peripherally surrounding and protecting the hard surface components thereof. By employing integrally bonded, multilayer foamed member/profile 20, the particular hard surface components are covered with a soft cushioning layer, while also possessing outer layer 22 which is capable of withstanding exposure to environmental degradation as well as chemical and physical attacks attempting to erode, puncture, or remove outer layer 22 from core member 21.

In addition, outer layer 22 also imparts abrasion resistance to integrally bonded, multilayer foamed member/profile 20, enabling member/profile 20 to withstand repeated abrasion, abutting, and even puncturing contact, without incurring degradation of outer layer 22, as well as access or degradation of core member 21. As a result, the present invention is capable of virtually eliminating all of the drawbacks and difficulties found with prior art systems.

In the preferred embodiment, elongated, cylindrically shaped, foamed thermoplastic or elastomeric core member 21 is formed from a thermoplastic polymer, elastomeric polymer, copolymer, homopolymer or mixture thereof. In general, it has been found that such products are preferably formed from polyethylene and are constructed with the final polyethylene foam having a density ranging between about 10 kg/m$^3$ and 500 kg/m$^3$. If desired, any natural or synthetic rubber or mixtures of natural or synthetic rubber with thermoplastic polymers can also be employed with equal efficacy, with departing from the scope of the present invention.

In forming elongated, foamed thermoplastic or elastomeric core member 21, the desired composition is mixed and then chemically or physically blown, using a conventional extrusion process, forming the desired shape in the precisely desired size and configuration. In achieving this result, the cells can be either open or closed cells, with the core member being formed in any desired hardness or softness. Furthermore, although FIG. 1 depicts thermoplastic or elastomeric core member 21 formed as an elongated, hollow tube member, core member 21 may comprise any desired size and shape as well as being formed with or without a hollow zone.

Although any desired thermoplastic polymer, elastomeric polymer, copolymer, homopolymer, or mixtures thereof may be employed to form thermoplastic or elastomeric core member 21, the preferred plastic material is preferably selected from the group consisting of polyethylenes, metallocene catalyzed polyethylenes, polybutylenes, polyurethanes, silicones, vinyl based resins, thermoplastic elastomer, polyesters, ethylene acrylic copolymers, ethylene-vinyl-acetate copolymers, ethylene-methyl acrylate copolymers, ethylene-butyl-acrylate copolymers, ethylene-propylene-rubber, styrene butadiene rubber, ethylene-ethyl-acrylic copolymers, ionomers, polypropylenes, and copolymers of polypropylene and copolymerizable ethylenically unsaturated commoners. Furthermore, in those instances when polyethylene is employed, it has been found that the polyethylene may comprise one or more polyethylenes selected from the group consisting of high density, medium density, low density, linear low density, ultra high density, and medium low density.

The particular material employed for core member 21 is selected based upon the end use for which the multilayer foamed member/profile 20 is to be employed. In this regard, for use as a cushioning member on metallic or other rigid or hard surfaces, it has been found that a density below 240 kg/m$^3$ is employed, so as to provide a core member which is classified as a low density flexible foam member. In addition, it has been found that a density ranging between about 10 kg/m$^3$ and 100 kg/m$^3$ is preferred. By employing a foam core member of this nature, the desired soft cushioning, compressibility, and shock mitigation is attained, while also providing resiliency for returning to its original configuration after impact.

In order to provide the desired resistance to chemical and physical degradation, the principal characteristics from which prior art products have suffered, a foamed thermoplastic or elastomeric core member 21 of the present invention is preferably formed incorporating between about 5% and 95% metallocene catalyzed polyethylene as one of the components thereof. As detailed herein, by employing metallocene catalyzed polyethylenes as one of the materials selected for the composition of the thermoplastic or elastomeric core member 21, increased resistance to tearing as well as increased bonding strength is realized. Furthermore, it has been found that in the preferred composition, the metallocene catalyzed polyethylenes ranges between about 20% to 60% by weight of the entire weight of the composition of the thermoplastic or elastomeric core member.

In the preferred construction, the foamed thermoplastic or elastomeric core member is formed with a density ranging between about 10 kg/m$^3$ and 100 kg/m$^3$. Furthermore, in most applications wherein a low density foamed member is desired, densities ranging between about 16 kg/m$^3$ and 60 kg/m$^3$ are preferred. In addition to this density range, the resulting foamed thermoplastic or elastomeric core member 21 also comprises a cell size ranging between about 0.5 mm and 10 mm. Although foams having a cell size falling within this range have been found to be well suited for providing the desired physical and chemical characteristics, the cell size of the resulting thermoplastic or elastomeric core member 21 preferably ranges between about 2.0 mm and 6.0 mm.

In addition to incorporating a metallocene catalyzed polyethylene in the plastic material forming foamed thermoplastic or elastomeric core member 21, any other desired additives may also be employed for attaining specific physical characteristics. Although any desired additive can be employed, typical additives used in the plastic material are selected from the group consisting of flame retardants, ultraviolet stabilizers, nucleating agents, physical and chemical blowing agents, volume stabilizing agents, colorants, and pigments.

As discussed above, by employing metallocene catalyzed polyethylenes as a component of the plastic material employed for forming foamed thermoplastic or elastomeric core member 21, substantially improved physical properties are attained. These physical properties include tensile strength, tear strength, elongation to break, as well as bonding or sealing strength. In order to demonstrate the efficacy of incorporating metallocene based polyethylenes in the formulation of the foamed thermoplastic or elastomeric core member 21, several samples were prepared employing different quantities of metallocene catalyzed low density polyethylenes in combination with low density polyethylene. After preparation, each sample was tested to determine the tear strength, tensile strength and elongation to break. In addition, a foamed thermoplastic or elastomeric member was formed using only low density polyethylene, with the same tests being performed thereon for comparative purposes. By referring to Table I, the results attained from these tests are provided.

TABLE I

| Property Material | LDPE | 10% mLDPE | 20% mLDPE | 30% mLDPE | 40% mLDPE |
|---|---|---|---|---|---|
| Tear Strength lbs/in. | 3.1 | 5.1 | 6.23 | 10.2 | 11.7 |
| Tensile Strength lbs/in$_2$ | 39.0 | 36.8 | 39.0 | 43.5 | 46.7 |
| Elongation to Break % | 57.8 | 68.9 | 79.2 | 115.8 | 152.3 |

Density of each sample = 32 kg/m$^3$
Cell size of each sample = 1.0 mm

As is evident from a review of Table I, by increasing the amount of metallocene catalyzed polyethylene employed in the plastic material forming the foamed thermoplastic or elastomeric core member, the tear strength, tensile strength, and elongation to break of the resulting foam member are increased. When 20% and less of a metallocene catalyzed polyethylene is employed, the resulting product has a tensile strength substantially equal to, or slightly less than, the tensile strength of a foamed core member formed entirely from low density polyethylene. However, by increasing the quantity of metallocene catalyzed polyethylene above 20% by weight of the weight of the entire plastic material, the tensile strength attained is substantially greater than the tensile strength provided by a foamed core member manufactured entirely from low density polyethylene. As noted in Table I, in each instance, the foamed core member comprises a density of 32 kg/m$^3$ (2 pounds per foot cubed) with a cell size maintained at about 1.0 mm.

As also shown in Table I, the tear strength property of the foamed thermoplastic or elastomeric member incorporating 10% metallocene was increased by over 66% when compared to the foam member comprising 100% low density polyethylene. Furthermore, by incorporating greater quantities of metallocene catalyzed polyethylene in the composition, the tear strength property was additionally increased in each sample.

Table I also clearly demonstrates that the inclusion of metallocene catalyzed polyethylene caused the percent elongation to break to be increased and that each time more metallocene catalyzed polyethylene was employed, a high elongation to break was obtained. As is evident from these results, substantially superior physical characteristics are produced by combining metallocene catalyzed polyethylene as one of the components of the plastic material employed for forming the foamed member. These physical characteristics, as well as additional physical characteristics detailed herein, provide a foam member which enables an outer layer to be securely bonded thereto, overcoming all of the prior art difficulties and producing the unique construction of the present invention.

In order to provide the desired peripherally surrounding, protective, intimate, bonded interengagement of outer layer 22 with foamed thermoplastic or elastomeric core member 21, outer layer 22 is preferably formed from plastic material substantially identical or similar to the plastic material employed for core member 21. However, as detailed herein, the physical characteristics imparted to outer layer 22 differ substantially from the physical characteristics of core member 21.

In the preferred construction, outer layer 22 is constructed to peripherally surround and fully envelop thermoplastic or elastomeric core member 21 while being intimately bonded thereto, with the contacting surfaces thereof being intimately interengaged with each other. Furthermore, in order to provide the protective characteristics desired for outer layer 22, outer layer 22 comprises a thickness ranging between about 0.1 mm and 5 mm. However, depending on the product desired, outer layer 22 may be formed with any thickness, either in a single application or in multiple applications.

In order to achieve an outer layer 22 which is resistant to the physical, chemical, and environmental abuses required for achieving the goals of the present invention, outer layer 22 preferably comprises a density ranging between about 100 kg/m$^3$ and 1,200 kg/m$^3$. Although this range has been found to produce an outer layer which is highly effective in possessing all of the desired physical characteristics, it has been found that the density of outer layer 22 preferably ranges between about 500 kg/m$^3$ and 1,200 kg/m$^3$.

In order to provide outer layer 22 which is in intimate bonded interengagement with core member 21, it is important that the plastic material employed for outer layer 22 be compatible with the plastic material employed for core member 21. In this regard, plastic material either identical, compatible, or similar to the plastic material employed for core member 21 is employed. In the preferred embodiment, outer layer 21 is formed from plastic material selected from the group consisting of metallocene based low density polyethylenes, low density polyethylenes, ethylenic copolymers, ethylene-vinyl-acetates, ethylene-butyl-acrylates, ethylene-methyl acrylate, ethylene acrylic acid, di-block and tri-block ethylene styrene, and ethylene butylene styrene copolymers.

In addition to the plastic materials forming the composition of outer layer 22, other additives normally employed in foaming thermoplastic or elastomeric materials may be employed. Although any desired additives can be used without departing from the scope of this invention, preferred additives employed in the formulation are selected from the group consisting of density reducing agents, physical or chemical blowing agents, pigments, flame retardants, ultraviolet stabilizers, talc, fibers, and fillers.

In order to achieve the desired integral bonded interengagement between outer layer 22 and core member 21, outer layer 22 is formed about core member 21 using a process which provides the desired secure, affixed, interengagement of outer layer 22 to the outer surface of core member 21 in substantially its entirety. As detailed below, this intimate bonded interengagement is preferably attained by employing a cross head extrusion process.

Although cross head extrusion is known in the art and has been employed for many years, the unique equipment and process steps detailed herein provide a construction which attains a novel manufacturing process which enables outer layer 22 to be intimately bonded in secure affixation to core member 21 in a mass producible, continuous manufactured extrusion system. By employing the process and extrusion dies detailed below, outer layer 22 is applied to core member 21 peripherally surrounding core member 21 in its entirety and fully encapsulating core member 21 with outer layer 22 in a secure, bonded, interengagement therewith, producing an outer protective layer for core member 21 which resists environmental, chemical, and physical abuse and/or degradation. As a result, the desired integrally bonded, multilayer foamed member/profile 20 of the present invention is attained.

Furthermore, by employing any desired additives in the formation of outer layer 22, as detailed above, member/profile 20 is attained with an outer surface which is chemically resistant to unwanted attacks, electrostatically dissipative, heat resistant, flame retardant, ultraviolet stabilized, and incorporates any desired visual colorings, additives, or effects.

Figure 2:
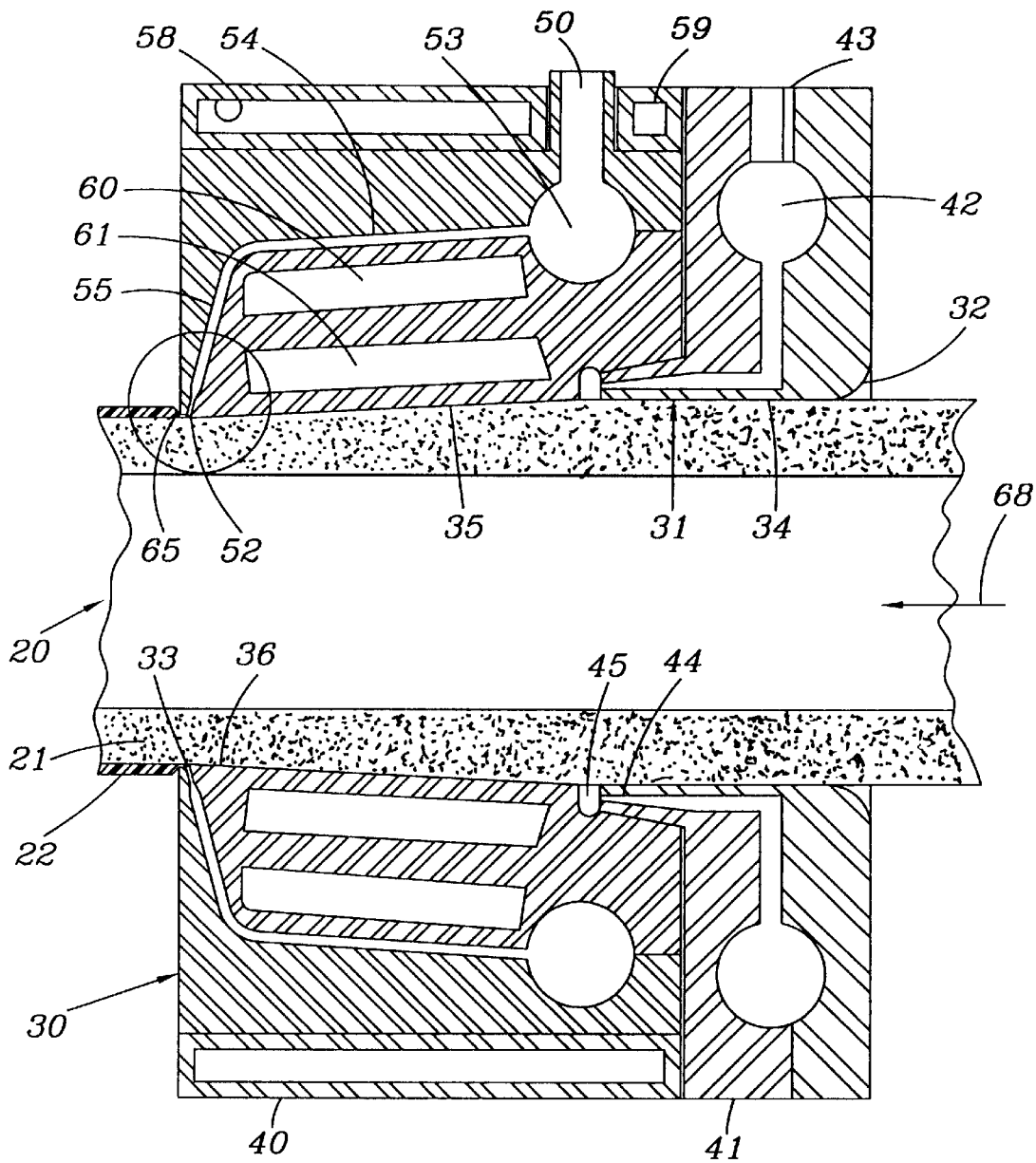
FIG. 2 is a cross-sectional top plan view of a cross head die constructed for being employed using the process of the present invention.
Figure 3:
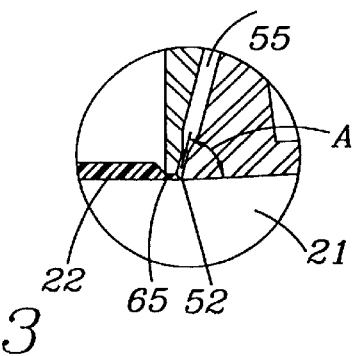
FIG. 3 is an enlarged cross-sectional view of the encircled area of FIG. 2.

By referring to FIG. 2, along with the following detailed disclosure, the application of outer layer 22 to core member 21 using the process of the present invention can best be understood. In order to attain a secure, bonded, affixed interengagement of outer layer 22 with core member 21, a cross head extrusion die system is employed. As a result, foamed thermoplastic or elastomeric core member 21 is formed in a conventional extrusion process and stored until ready for application of outer layer 22 thereto. When the peripheral surrounding bonded interengagement of outer layer 22 to core member 21 is desired, a uniquely constructed, cross head extrusion die 30 of the present invention is employed.

As shown in FIG. 2, cross head extrusion die 30 of the present invention is constructed for peripherally surrounding and fully enveloping the particular shape of foamed thermoplastic or elastomeric core member 21. As depicted in FIG. 2, with core member 21 comprising a hollow cylindrical shape, cross head extrusion die 30 is constructed with an elongated, cylindrical passageway 31 which is dimensioned for cooperating with the configuration of core member 21.

Passageway 31 comprises an entry portal 32 and an exit portal 33. As further detailed below, elongated passageway 31 is formed in three separate and distinct zones or sections, larger diameter section 34, central section 35, and smaller diameter section 36. Section 34 comprises a first, larger diameter zone which is dimensioned for receiving cylindrically shaped, elongated, formed thermoplastic or elastomeric core member 21 as originally produced, in a manner which will enable core member 21 to contact section 32, while also being slidably engageable therewith. Central section 35 of passageway 31 comprises a sloping, tapering section which compresses and densifies core member 21, as part of the manufacturing process. Finally, smaller diameter section 34 of passageway 31 is generally circular in cross-section, having a diameter consistent with the diameter desired for the final integrally bonded, multilayer foamed member/profile of the present invention.

In the preferred embodiment of the present invention, cross head die 30 comprises two principal portions, a die body portion 40 and a vacuum body portion 41. Vacuum body portion 41 incorporates entry portal 32 and larger diameter section 34 of passageway 31. In addition, vacuum body portion 41 incorporates a vacuum channel 42, which extends through vacuum body portion 41 terminating exteriorly with exit portal 43, and terminating interiorly with portal 44.

In the preferred embodiment, exit portal 43 of vacuum channel 42 is connected directly to a vacuum source which maintains vacuum conditions throughout channel 42. In addition, interior portal 44 is interconnected with an annual interior cavity 45 which is continuously maintained under vacuum conditions due to the construction and operation of vacuum channel 42. In addition, annual interior cavity 45 establishes a transition between large diameter section 34 and central, ramped, sloping section 35 of passageway 31. As is more fully detailed below, this transition, as well as the establishment of an annular interior cavity 45, which is maintained continuously under vacuum conditions, assures the removal of unwanted gases.

Die body portion 40 of cross head die 30 of the present invention incorporates a polymer melt delivery channel 50 which extends from exit portal 51 formed at the outer surface of cross head die 30 to an interior portal 52 formed in cooperative association with smaller diameter section 36 of passageway 31. In the preferred embodiment, polymer melt delivery channel 50 comprises a holding zone 53 formed below exit portal 51 internally within die body portion 40 and interconnected to exit portal 51 with an enlarged interconnecting passageway. In addition, polymer melt delivery channel 50 also comprises two cooperating, reduced diameter polymer melt feed lines formed as polymer melt delivery feed line 54 and polymer melt metering feed line 55. In particular, as detailed below, the angular relationship of polymer melt metering feed line 55 to smaller diameter section 36 is preferably controlled in a precisely desired relationship, in order to produce secure, affixed, bonded interengagement of outer layer 22 to core member 21.

Die body portion 40 of cross head extrusion die 30 also incorporates a plurality of cavities formed therein within which heating means are positioned in order to provide precisely desired temperature levels within die body portion 40. In this regard, die body portion 40 incorporates cavities 58 and 59 near the exterior surface of die body portion 40 directly adjacent exit portal 41, holding zone 53, and the interconnecting passageway therebetween. By employing suitable heat producing means within cavities 58 and 59, the polymer melt being employed for producing outer layer 22 is maintained at the precisely desired temperature level to assure that the polymer melt will flow through die body portion 40 in the precisely desired manner.

In addition, die body portion 40 also comprises a cavity 60 directly adjacent polymer melt delivery feed line 54 and polymer melt metering feed line 55 in order to maintain the polymer melt passing therethrough at the precisely desired temperature. Finally, die body portion 40 also comprises an annular cavity 61, formed directly adjacent sloping, tapered, intermediate section 35 of passageway 31 to raise the temperature level of the outer surface of core member 21 as detailed below.

In each of the cavities detailed above, namely cavities 58, 59, 60, and 61, each cavity is substantially annular in configuration, formed throughout the entire die body portion 40. In this way, the precisely desired temperature level is maintained throughout the entire die body portion 40, assuring that the polymer melt as well as the core member are maintained at the desired temperatures in each and every area thereof.

Any known, conventional heating means may be employed in cavities 58, 59, 60, and 61 in order to produce and maintain the precisely desired temperature levels. Such heating means commonly employed in the industry include both electrical and conventional heating means commonly employed in the industry which include water, oil, cartridge heaters, and heater bands. These heating means or any other conventional heating means can be employed in die 30, without departing from the scope of this invention.

In addition, in order to assure that the desired temperature levels are maintained throughout cross head extrusion die 30, the preferred embodiment of the present invention incorporates a heating jacket which peripherally surrounds die 30 and maintains die 30 at the precisely desired elevated temperature level. In this way, temperature differentials are eliminated and the elevated temperature desired for core member 21 and the polymer melt flowing through delivery channel 50 are maintained throughout die 30.

In order to assure that the polymer melt flowing through delivery channel 50 is maintained at the desired temperature level to produce flow of the polymer melt through cross head extrusion die 30, as well as onto core member 21 at the desired temperature, thermocouples are preferably placed in various locations of cross head extrusion die 30. In this regard, it has been found that thermocouples should be positioned at similar locations in the delivery channel at spacings of at least 180° in order to assure that the polymer melt throughout die 30 is at the desired temperature. Furthermore, in the preferred construction, temperature deviation of + or −1° C. is maintained. In this way, the desired flow and application characteristics sought for the polymer melt in forming outer layer 22 are attained.

In the preferred embodiment, cross head extrusion die 30 of the present invention incorporates several unique construction features in order to achieve the secure, intimate bonded interengagement of outer layer 22 with foam thermoplastic or elastomeric core member 21. One of these unique construction features incorporated into cross head die 30 is the angular relationship at which all polymer melt metering feed line 55 is positioned relative to smaller diameter section 36 of passageway 31. As shown in FIG. 2, polymer melt metering fee line 55 is arcuately disposed relative to the surface of smaller diameter section 36 at an acute approach angle designated "A".

In the preferred construction, approach angle "A" preferably ranges between about 30° and 90°. By employing an approach angle falling within this range, the polymer melt flowing through metering feed line 55 is capable of exerting sufficient pressure on core member 22 to achieve the desired, complete, thorough, bonded interengagement between core member 21 and outer layer 22.

Although approach angles ranging between about 30° and 90° have been found to produce highly effective results, an optimum approach angle "A" has been found to range between about 60° to 75°.

In addition, in the preferred construction of cross head extrusion die 30 of the present invention, smaller diameter section 36 of passageway 31 incorporates an outer layer forming zone or land 65 extending between interior portal 52 of metering feed line 55 and exit portal 33 of passageway 31. In the preferred embodiment, zone/land 65 comprises a width ranging between 0 mm and 30 mm. By forming zone/land 65 in this manner, a forming area is provided for controlling and producing fully contacted, interengagement and formation of outer layer 22 in secure, affixed, bonded interconnection with core member 21.

Although the width of zone/land 65 preferably ranges between about 0 mm and 30 mm, it has been found that optimum results are attained wherein land 65 has a width ranging between about 0 mm and 5 mm. By employing this construction, optimum results have been realized.

In addition to producing secure, bonded affixation of outer layer 22 to core member 21 by employing zone/land 65 with the desired width detailed above, the diameter of zone or land 65 is constructed to be greater than the diameter of smaller diameter section 36 of passageway 31 directly adjacent interior portal 52. By controlling the diameter of forming zone/land 65, the precisely desired thickness for outer layer 22 is controlled and established.

Consequently, if a substantially thin outer layer 22 is desired, the diameter of forming zone/land 65 is slightly greater than the diameter of section 36. However, when a substantially thicker outer layer 22 is being formed, zone/land 65 is constructed with a diameter substantially greater than the diameter of section 36. In this way, any desired thickness can be easily accommodated for outer layer 22, while also assuring secure, bonded affixation of outer layer 22 to core member 21.

Another structural feature incorporated by cross head extrusion die 30 of the present invention is the construction and operation of central or intermediate section 35 of passageway 31. As discussed above, intermediate section 35 comprises a ramped, sloping configuration extending between larger diameter section 34 and smaller diameter section 36. In addition, annular cavity 61 is positioned in juxtaposed, spaced, cooperating relationship with section 35 for providing the desired elevated temperature to section 35.

In the preferred embodiment, section 35, with heated annular cavity 61 cooperatively associated therewith, causes the outer surface of core member 21 to be heated as core member 21 longitudinally advances through passageway 31 in the direction shown by arrow 68. By heating the outer surface of core member 21, the gas(es) trapped within the closed cells adjacent the outer surface of core member 21 are released as the cells are ruptured. Once released, the gases are drawn into annular interior cavity 45 and removed from die 30 through vacuum channel 42.

In addition, as detailed above, intermediate or central section 35 of passageway 31 comprises a ramped, sloping configuration which effectively squeezes or compresses core member 21 as core member 21 advances through extrusion die 30 of the present invention. By simultaneously heating the surface of core member 21 while also compressing or squeezing member 21 from a larger diameter to a smaller diameter, the number of cells being broken is optimized and the gas retained therein is released and removed.

As core member 21 emerges from the sloped, ramped intermediate section 35 and enters smaller diameter section 36, the outer surface of core member 21 is brought into contact with the polymer melt forming outer layer 22. Since the polymer melt is maintained at an elevated temperature, above the melting point of the polymer material, the application of the hot polymer melt to the surface of core member 21 causes any remaining cells to be ruptured as contact is made between core member 21 and the hot polymer melt of outer layer 22. Any gas emerging from these ruptured cells passes between central section 35 and core member 21 to be withdrawn through annular interior cavity 45 and vacuum channel 42.

By employing the construction detailed above for cross head extrusion die 30, a substantial quantity of the closed cells adjacent the outer surface of core member 21 are ruptured and the gas entrapped therein is removed prior to the application of outer layer 22. This process has been found to be of particular importance in assuring a secure, intimate, bonded interengagement between outer layer 22 of core member 21 as well as in providing a surface on core member 21 which is substantially enhanced for bonded interengagement with outer layer 22.

In this regard, it has been found that the rupturing of the cells near the surface of core member 21 prior to the application of outer layer 22 effectively increases the density of the outer surface of core member 21. This densification process has been found to be of particular importance in providing secure, bonded affixation of outer layer 22 to the outer surface of core member 21.

One beneficial result achieved by rupturing the closed cells near the outer surface of core member 21 is the virtual elimination of any possibility that the cells will be ruptured after the application of outer layer 22. By rupturing the cells prior to the application of outer layer 22 and removing the gas retained therein, the possibility that pockets of the entrapped gases might be formed between outer layer 22 and core member 21 is virtually eliminated.

Another benefit derived from the densification of the outer surface of core member 21 is a substantial increase in the peel strength resulting between core member 21 and outer layer 22. It is well established that the tear strength of a foamed plastic material is directly proportional to the density of the material. Consequently, the density increase achieved at the surface of core member 21 causes the tear strength of the surface of core member 21 to be proportionally increased.

As a result, once outer layer 22 is securely bonded to core member 21, the effective bonded interengagement between outer layer 22 and core member 21 is on the outer surface of core member 21, the precise location where the density of the core member 21 has been increased. As a result, due to the increased tear strength resulting from the densification of the outer surface of core member 21, the effective bond and peel strength between outer layer 22 and core member 21 is similarly increased and substantially enhanced.

In this regard, it has been found that by employing the plastic formulation detailed above for core member 21, any desired polymer melt may be employed for outer layer 22. By incorporating metallocene catalyzed polyethylene as one of the plastic materials employed in formulating core member 21, as detailed above, the resulting member core member 21 incorporates a uniquely desirable physical attribute. The physical attribute produced is a substantial increase in the melt strength or tack strength of the resulting core member, which causes core member 21 to be securely bonded to any component applied to the outer surface thereof at a temperature sufficient to melt the surface of core member 21.

As detailed above, since outer layer 22 is applied to core member 21 at a substantially elevated temperature, the surface of core member 21 is effectively melted, thereby providing bonded inter-engagement of outer layer 22 with core member 21 wherein the contacting surfaces are effectively melted in interengagement with each other. As a result, the resulting integrally bonded, multilayered foam member profile 20 produced has outer layer 22 effectively integrally molded or bonded onto core member 21 wherein removal of outer layer 22 from core member 21 requires forces which are incapable of being produced by normal physical or chemical attacks.

In order to form outer layer 22 on core member 21 using cross head extrusion die 30 of the present invention, core member 21 must pass through passageway 31 of die 30 in the direction of arrow 68. The physical movement of core member 21 through die 30 may be achieved by pulling core member 21 through die 30, pushing core member 21 through die 30, or simultaneously pushing and pulling core member 21 through die 30. Regardless of which method is employed, substantially similar results are attained.

In addition, in order to assure the secure, bonded affixation of outer layer 22 to core member 21, the dimensions of core member 21 must be tightly controlled to enable the outer surface of core member 21 to contact the walls of passageway 31 while also being capable of free sliding movement therethrough. Consequently, in the preferred embodiment, core member 21 is formed with precise dimensional control being maintained over the outer diameter thereof.

Preferably, foamed thermoplastic or elastomeric core member 21 is produced with a diameter equivalent to the diameter of larger diameter section 34 of passageway 31 with the tolerances of this diameter being maintained at +1 mm. By controlling the production of core member 21 to possess a diameter equivalent to the diameter of section 34 of passageway 31 or +1 mm greater than this diameter, assurance is provided that the desired heat transfer from die 30 to core member 21 is attained, while also assuring that the frictional drag between core member 21 and die 30 can be easily overcome to produce the desired, smooth, continuous production application of outer layer 22 to the surface of core member 21. Furthermore, if desired, passageway 31 of die 30 may be coated with low friction material in order to reduce frictional drag and enhance the movement of core member 21 through die 30.

In addition to controlling the diameter of core member 21, the overall roundness or ovality of core member 21 must also be tightly controlled. As a result, guides and sizing apparatus, well known in the art, are preferably employed to assure that the cross-section of core member 21 is circular in each location throughout the length of core member 21, with tolerances being maintained at +/−1.5 mm. It has been found that by producing core member 21 with these tolerances, the desired heat transfer and frictional contact between core member 21 and extrusion die 30 are attained. Furthermore, it has also been found that by providing core member 21 with dimensions substantially equivalent to the precisely desired normal dimensions, increased bonded interengagement is realized between outer layer 22 and core member 21.

In view of the fact that tolerances of core member 21 is extremely important to produce intimate bonded interengagement of outer layer 22 to core member 21, it has also been found that in any particular product requiring a substantially thick outer layer 22, such product is preferably produced by passing the product through a series of extrusion dies in order to build up outer layer 22 to the precisely desired thickness. Since the positioning and precise axial alignment of core member 21 with extrusion die 30 is critical in achieving a complete, integral bonded engagement of outer layer 22 to core member 21, the application of substantially thick outer layers becomes increasing difficult. However, by employing multiple passes through a plurality of extrusion dies, each possessing the dimensions required, the intimate, bonded interengagement of outer layer 22 to core member 21 can be achieved, with outer layer 22 possessing any desired thickness.

It will thus be seen that the objects set forth above, among those made apparent from the preceding description, are efficiently attained and, since certain changes may be made in carrying out the above method and in the article set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly, it is to be understood that in said claims, ingredients or compounds recited in the singular are intended to include compatible mixtures of such ingredients wherever the sense permits.

Having described our invention, what we claim as new and desire to secure by Letters Patent is:

1. A method for mass producing multilayer foamed thermoplastic or elastomeric members or profiles having at least two layers in intimate bonded interengagement with each other, said method comprising the steps of A. extruding a foamed core member;

B. cooling the extruded foamed core member;

C. passing the core member through a cross head extrusion die for applying an outer layer to the surface of said core member;

D. heating the surface of the core member to a temperature approaching the melting point of the core member prior to applying the outer layer thereto;

E. applying a molten plastic coating to the heated surface of the core member for peripherally surrounding and substantially enveloping the core member with the molten plastic material maintained at a temperature above the melting point of the core member;

F. releasing gases from the cells of the core member by said foregoing heating steps;

G. removing the released gases; and

H. allowing the coated core member to cool, thereby producing a core member having an outer layer peripherally surrounding said core member in integral, bonded interengagement therewith.

2. The method defined in claim 1, wherein said molten plastic outer layer is applied to the core member in a manner which effectively causes melting of the surface of the core member to attain an integrally bonded, melted engagement between said core member and said outer layer.

3. The method defined in claim 1, wherein the foamed core member is further defined as comprising plastic material comprising one or more selected from the group consisting of polyethylenes, metallocene catalyzed polyethylenes, polybutylenes, polyurethanes, silicones, vinyl based resins, thermoplastic elastomer, polyesters, ethylene acrylic copolymers, ethylene-vinyl-acetate copolymers, ethylene-methyl acrylate copolymers, ethylene-butyl-acrylate copolymers, ethylene-propylene-rubber, styrene butadiene rubber, ethylene-ethyl-acrylic copolymers, ionomers, polypropylenes, and copolymers of polypropylene and copolymerizable ethylenically unsaturated comonomers.

4. The method defined in claim 1, wherein said foamed core member is further defined as being formed from extruded foamed plastic material and comprising:

A. a density ranging between bout 10 kg/m$^3$ and 500 kg/m$^3$, and

B. between about 5% and 95% by weight of the entire weight of the core member of at least one metallocene catalyzed polyethylene.

5. The method defined in claim 4, wherein the plastic coating forming the outer layer is defined as comprising a density ranging between about 100 kg/m$^3$ and 1,200 kg/m$^3$.

6. The method defined in claim 4, wherein said metallocene catalyzed polyethylene forming the core member is further defined as comprising one or more selected from the group consisting of high density, medium density, low density, linear low density, ultra high density, and medium low density.

7. The method defined in claim 4, wherein said core member is further defined as further comprising one or more additives selected from the group consisting of flame retardants, ultraviolet stabilizers, nucleating agents, physical blowing agents, chemical blowing agents, volume stabilizing agents, colorants, and pigments.

8. The method defined in claim 1, wherein said plastic coating forming the outer layer is further defined as comprising a thickness ranging between about 0.1 mm and 5 mm and comprising a density ranging between about 100 kg/m$^3$ and 1,200 kg/m$^3$.

9. The method defined in claim 8, wherein said outer layer is further defined as being formed from plastic material selected from the group consisting of metallocene catalyzed low density polyethylenes, low density polyethylenes, ethylenic copolymers, ethylene-vinyl-acetates, ethylene-butyl-acrylates, ethylene-methyl acrylate, ethylene acrylic acids, di-block and tri-block ethylene styrene, and ethylene butylene styrene copolymers.

10. The method defined in claim 9, wherein said outer layer is further defined as incorporating one or more additives selected from the group consisting of density reducing agents, physical blowing agents, chemical blowing agents, pigments, flame retardants, ultraviolet stabilizers, talc, fibers, and fillers.

11. The method defined in claim 1, comprising the additional step of

I. densifying the surface of the core member prior to applying the molten plastic coating thereto by rupturing the cells at said surface and near said surface, thereby increasing the density thereof.

12. The method defined in claim 11, comprising the additional step of

J. compressing the core member during the heating step and the densifying step by passing the core member rom a first zone having a first diameter to a second zone having a second diameter which is less than the diameter of the first zone.

13. The method defined in claim 1, further comprising the additional step of

I. exposing the outer surface of the core member to a vacuum source after the heating step for completely removing the released gases therefrom.

14. A method for mass producing multilayer foamed thermoplastic or elastomeric members or profiles having at least two layers in intimate bonded interengagement with each other, said method comprising the steps of A. extruding a foamed core member having a density ranging between about 10 kg/m$^3$ and 100 kg/m$^3$;

B. cooling the extruded foamed core member;

C. passing the core member through a cross head extrusion die for applying an outer layer to the surface of said core member;

D. heating the surface of the core member to a temperature approaching the melting point of the core member prior to applying the outer layer thereto;

E. applying a molten plastic coating to the heated surface of the core member for peripherally surrounding and substantially enveloping the core member with the molten plastic material maintained at a temperature above the melting point of the core member;

F. releasing gases from the cells of the core member by said foregoing heating steps;

G. removing the released gases; and

H. allowing the coated core member to cool, thereby producing a core member having an outer layer peripherally surrounding said core member in integral, bonded interengagement therewith and having a density ranging between about 10 kg/m$^3$ and 1,200 kg/m$^3$.

* * * * *